(12) United States Patent
Levy

(10) Patent No.: US 11,059,579 B2
(45) Date of Patent: Jul. 13, 2021

(54) UNIVERSAL FLYING TERRAIN VEHICLE

(71) Applicant: Moshe Levy, Jerusalem (IL)

(72) Inventor: Moshe Levy, Jerusalem (IL)

( * ) Notice: Subject to any disclaimer, the term of this patent is extended or adjusted under 35 U.S.C. 154(b) by 185 days.

(21) Appl. No.: 16/473,363

(22) PCT Filed: Dec. 26, 2017

(86) PCT No.: PCT/IL2017/051388
§ 371 (c)(1),
(2) Date: Jun. 25, 2019

(87) PCT Pub. No.: WO2018/122842
PCT Pub. Date: Jul. 5, 2018

(65) Prior Publication Data
US 2020/0140081 A1    May 7, 2020

(30) Foreign Application Priority Data
Jan. 1, 2017  (IL) .......................................... 249888

(51) Int. Cl.
*B64C 37/00* (2006.01)
*B64C 13/04* (2006.01)
(Continued)

(52) U.S. Cl.
CPC ............... *B64C 37/00* (2013.01); *B60D 7/00* (2013.01); *B60F 5/02* (2013.01); *B64C 7/00* (2013.01);
(Continued)

(58) Field of Classification Search
CPC ......... B64C 37/00; B64C 7/00; B64C 13/042; B64C 13/16; B64C 13/26; B64C 13/503; B64C 25/001; B64C 27/00; B64C 31/036; B64C 2025/008; B64C 25/10; B60D 7/00; B60F 5/02; B64D 27/02
See application file for complete search history.

(56) References Cited

U.S. PATENT DOCUMENTS 2,215,003 A * 9/1940 Johnson .................. B64C 37/00
244/2
2,373,467 A * 4/1945 Frakes .................... B64C 37/00
244/2
(Continued)

FOREIGN PATENT DOCUMENTS

| EP | 2750905 B1 | 9/2015 |
| FR | 1485308 A | 6/1967 |
| WO | 2016164416 A1 | 10/2016 |

OTHER PUBLICATIONS

International Search Report for PCT/IL2017/051388 dated Sep. 10, 2018.

*Primary Examiner* — Rodney A Bonnette
(74) *Attorney, Agent, or Firm* — Kelly & Kelley, LLP

(57) ABSTRACT

A universal aerial platform (11, 41) supports lift elements (13, 14), thrusters (15), landing gear (21, 22) and a fuel supply (16) and has a coupling mechanism (17) external to the aerial platform for coupling to a terrain vehicle (20) so as to convert any suitably adapted terrain vehicle to a flying vehicle (10, 40). The terrain vehicle forms the cockpit of the flying vehicle. The terrain vehicle (20) includes flight controls that are automatically coupled to the airplane structure either wirelessly or by wires when the terrain vehicle is coupled thereto.

17 Claims, 6 Drawing Sheets

(51) Int. Cl.

| | |
|---|---|
| *B60D 99/00* | (2009.01) |
| *B60F 5/02* | (2006.01) |
| *B64C 7/00* | (2006.01) |
| *B64C 13/16* | (2006.01) |
| *B64C 13/26* | (2006.01) |
| *B64C 13/50* | (2006.01) |
| *B64C 25/00* | (2006.01) |
| *B64C 25/10* | (2006.01) |
| *B64C 27/00* | (2006.01) |
| *B64C 31/036* | (2006.01) |
| *B64D 27/02* | (2006.01) |

(52) U.S. Cl.
CPC ............ *B64C 13/042* (2018.01); *B64C 13/16* (2013.01); *B64C 13/26* (2013.01); *B64C 13/503* (2013.01); *B64C 25/001* (2013.01); *B64C 25/10* (2013.01); *B64C 27/00* (2013.01); *B64C 31/036* (2013.01); *B64D 27/02* (2013.01); *B64C 2025/008* (2013.01)

(56) References Cited

U.S. PATENT DOCUMENTS

| | | | |
|---|---|---|---|
| 2,624,530 A | * | 1/1953 | Hanssen ................. B64C 37/00 244/2 |
| 3,645,474 A | | 2/1972 | Arbuse |
| 2008/0067284 A1 | | 3/2008 | Bakker |
| 2011/0163197 A1 | | 7/2011 | Farrag |
| 2014/0291440 A1 | | 10/2014 | Stekelenburg et al. |
| 2016/0023527 A1 | | 1/2016 | Dietrich |
| 2016/0229245 A1 | | 8/2016 | Stekelenburg et al. |
| 2016/0244160 A1 | | 8/2016 | Colten et al. |
| 2016/0272308 A1 | * | 9/2016 | Gentry .................... B64C 25/52 |
| 2017/0183094 A1 | * | 6/2017 | McNally ................ B64C 39/08 |

* cited by examiner

UNIVERSAL FLYING TERRAIN VEHICLE

FIELD OF THE INVENTION

This invention relates to "flying cars" defined in Wikipedia™ as any type of personal air vehicle that provides door-to-door transportation by both road and air.

BACKGROUND OF THE INVENTION

As long ago as 1940, Henry Ford predicted that a combination airplane and motor car is imminent and indeed much progress has been made in recent years to realize this dream. Among several practical prototypes are the PAL-V ONE manufactured by PAL-V International B.V. shown at http://pal-v.com/, which employs a three-wheel two seat hybrid car and gyroplane having a foldable rotor mast that may be extended to convert the vehicle into a helicopter as described in US 2008/0067284, US 2014/0291440 and US 2016/0229245.

Another company presently engaged in state-of-the-art flying cars is Aeromobil http://www.aeromobil.com/, which has developed a motor car having foldable side wings that unfold to form a conventional looking airplane. This is described in the patent literature for example in EP 2 750 905. Also of interest is Terrafugia's Transition® described in US 2016/0023527.

What characterizes these efforts at realizing Henry Ford's dream is that the vehicle is a custom-designed vehicle where the car is integral with and inseparable from the flying machine.

Efforts have also been made to develop a flying vehicle known as Skylys where the car may be separated from the wings and is then useable as a regular terrain vehicle. Thus a crowdfunding campaign was established in 2014 by a company known as Mix Aerospace whose website appears no longer to be active. But here, also, both the ground vehicle and the airborne component are custom designed interlocking elements. The ground vehicle is a specially profiled aerodynamic structure designed for tight accommodation in a cavity of the aerial platform.

There are several drawbacks with hitherto proposed flying cars. One is that because both the terrain vehicle and the airplane form an integral structure, it is not possible for the owner of a terrain vehicle to convert his vehicle to an airplane. Terrain vehicles are clearly optimized for driving on road surfaces and their engines and infrastructure are designed with this in mind, while conventional flying cars carry bulky wings and other components, which make them not well-suited for road handling. To the extent that such vehicles must be driven for long distances on the ground, there is also a higher risk of damage not only to the terrain vehicle but to the airplane owing in part to the fact that motorists are not as highly trained as pilots and the risk of collision is therefore greater; and also to wear and tear, which affects the airplane and its associated controls even when it is not airborne. This also makes it more difficult to obtain good insurance at an affordable price for the average motorist. It would clearly be desirable if the owner of a motor car could simply connect his vehicle to a universal airplane structure and thereby become airborne. In such case, the risk of damage to the airplane would be significantly reduced and minimal damage to the terrain vehicle would, in most cases, not prevent it from being coupled to the airplane structure.

Furthermore, road vehicle engines have a much lower lifetime than airplane engines, which means that conventional integral structures may need to be discarded even when the airplane component still has plenty of residual life.

Yet another potential drawback of known approaches relates to regulation. When used as a terrain vehicle a normal car license is sufficient. But in order to fly the vehicle, the owner must also have a pilot's license.

SUMMARY OF THE INVENTION

It is therefore an object of the present invention to provide a universal airplane structure that may be coupled to any suitably adapted terrain vehicle and thereby convert it into a flying car.

This object is realized in accordance with one aspect of the invention by a universal airplane structure having the features of the main claim.

The invention allows a car manufacturer to adapt any type of product-line vehicle for releasable coupling to an aerial platform according to the invention. The aerial platform can be a fixed-wing or rotate-wing or parafoil-wing airplane supporting fuel supply, propellers and landing gear and to which the terrain vehicle may in some embodiments form the cockpit. In other embodiments, the airplane may be pilotless and autonomous.

The terrain vehicle is connected to the airplane structure before takeoff and after landing is separated from it, in order to drive the terrain vehicle in conventional manner. In some embodiments the vehicle serves as the cockpit and includes the flight control platform including the requisite manual controls. Alternatively, the flying car can be an autonomous vehicle that is controlled wirelessly (data-link).

This invention overcomes the following drawbacks that are inherent in many known approaches:

- A car intended for use with the invention may be manufactured as a standard model that is altered to match the flying platform. The changes are minor and the cost is therefore very much less than the road vehicles of known flying cars, which are extensively redesigned and expensive.
- Since the terrain vehicle is basically a standard model, it is far more efficient on the road than a flying car.
- The invention allows any consumer to replace the car regularly and continue to use the same aerial platform, which is expensive.
- The invention will allow each manufacturer to choose from a variety of vehicle models produced which to adapt to the aerial platform.
- Consumers will be able to purchase a specially adapted airborne model that is identical in most respects to a mass-manufactured car.
- Consumers will be able to replace one model with another, without having to replace the expensive aerial platform.

It should be noted that within the context of the description and appended claims, the term "terrain vehicle" includes any road vehicle that is suitably modified for releasable coupling to the aerial platform. It may be an all-terrain vehicle or a regular saloon. But it could also be a motor cycle or other vehicle having suitable means for being supported by the aerial platform. The terrain vehicle does not transport the aerial platform but rather is transported by it and therefore its power capacity is not relevant.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following description of some embodiments, identical components that appear in more than one figure or that share similar functionality will be referenced by identical reference symbols.

Figure 1:
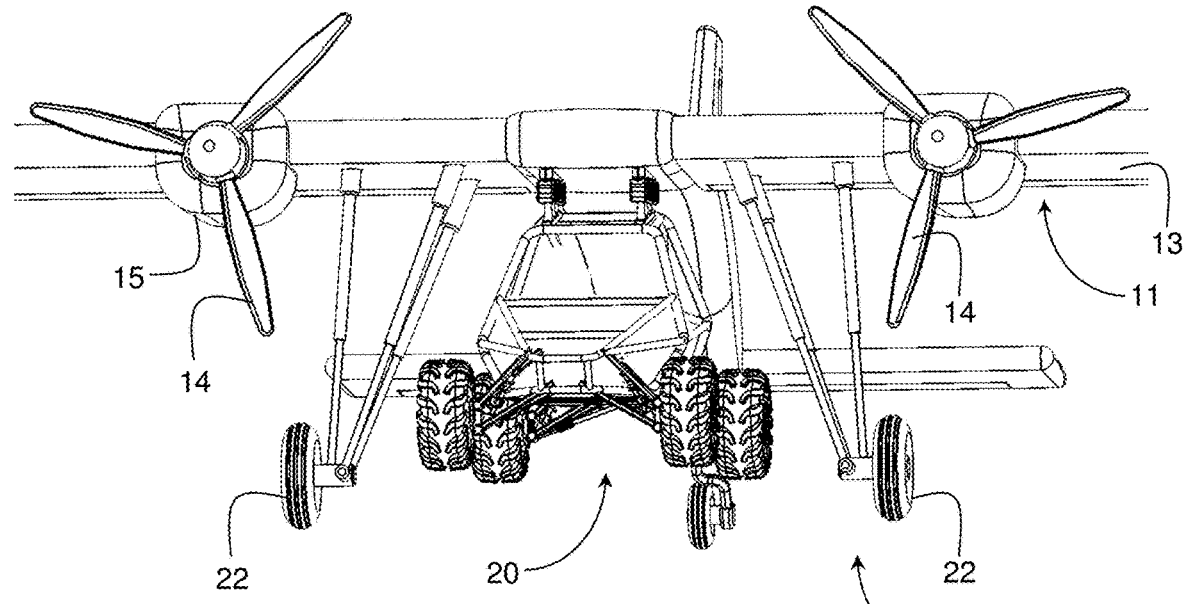
FIG. 1 is a partial front elevation showing a flying car according to a first embodiment of the invention comprising a terrain vehicle coupled to an aerial platform having a fixed wing.
Figure 2:
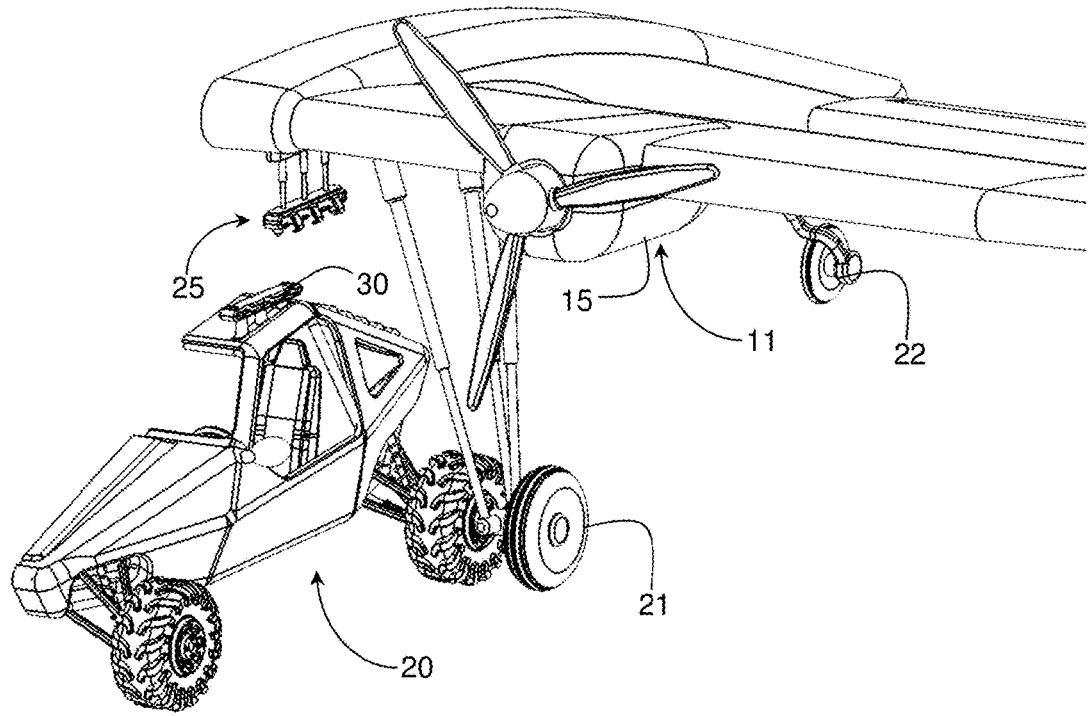
FIG. 2 is a partial section showing the terrain vehicle disengaged from the aerial platform.

FIG. 1 shows a flying vehicle 10 according to a first embodiment including an aerial platform 11 supporting wings 13, propellers 14 driven by a suitable thruster 15 coupled to a fuel supply shown schematically as 16. The aerial platform 11 also has a coupling mechanism 17 for coupling to a terrain vehicle 20. FIG. 2 shows a partial sectional view of the terrain vehicle 20 disengaged from the aerial platform 11.

Figure 3:
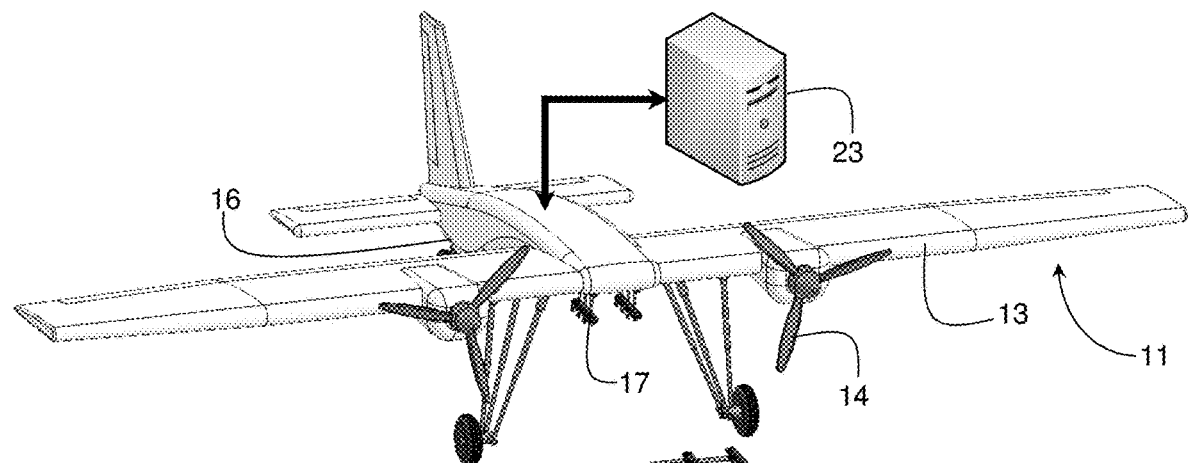
FIG. 3 is a pictorial view of the terrain vehicle after disengagement from the aerial platform.

The aerial platform 11 supports engines to create thrust, wings to create lift, control surfaces such as ailerons, rudder and height controls, an array of three undercarriages (primary and secondary landing gear having nose or tail wheels 21 and secondary wheels 22, respectively) to transport the weight during aircraft takeoff and landing, a servo control for the aircraft control surfaces and for the primary landing gear. The aerial platform 11 also has a chassis that is sufficiently massive to carry the combined weight of the aerial platform and the terrain vehicle and means for anchoring the terrain vehicle, which may serve as a cockpit or cabin. Additionally, a computer 23 in the aerial platform 11 shown schematically in FIG. 3 receives control signals from flight controllers installed in the cockpit (the ground assembly) and transfers these control signals to the control surfaces, throttles, steering main landing gear.

Figure 4:
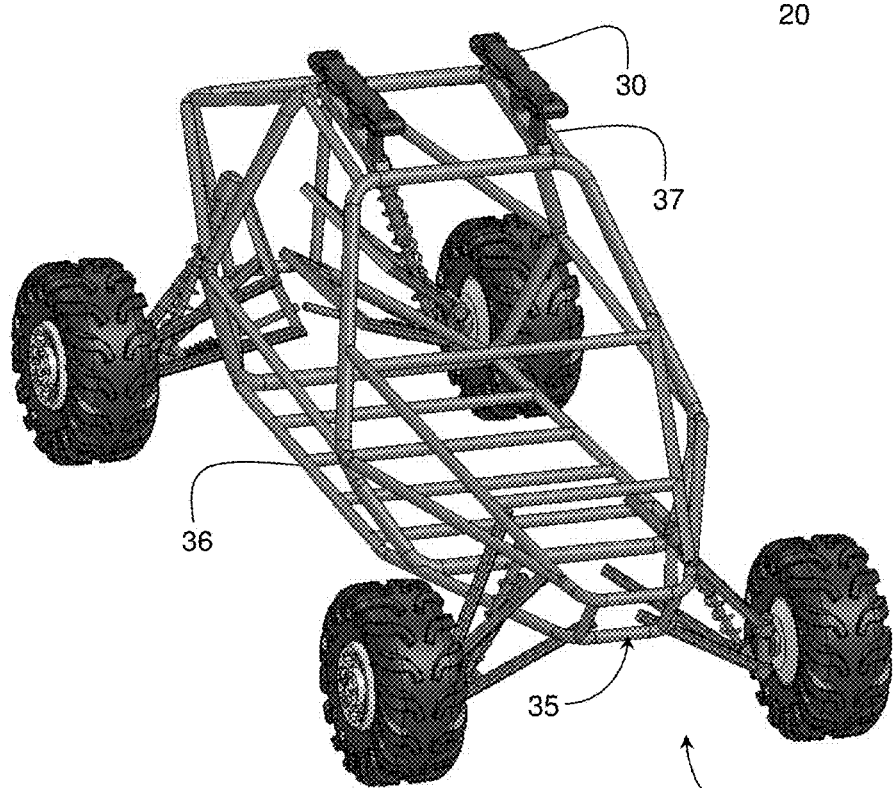
FIG. 4 is a pictorial view showing a detail of chassis of the terrain vehicle.
Figure 5:
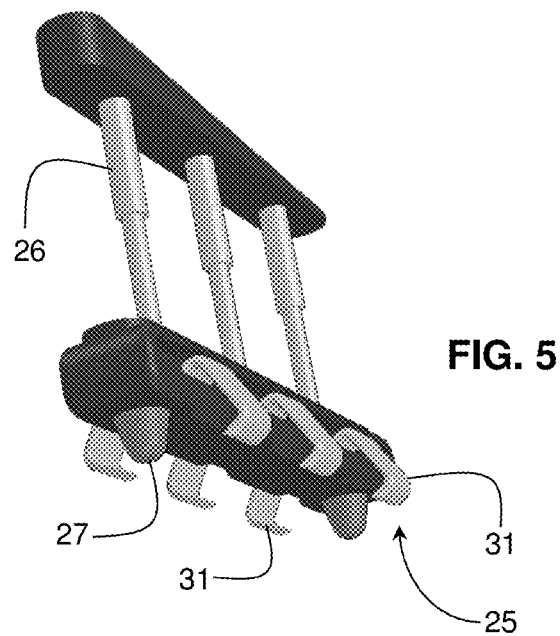
FIG. 5 is a pictorial view showing a detail of a coupling mechanism used in the aerial platform.
Figure 6:
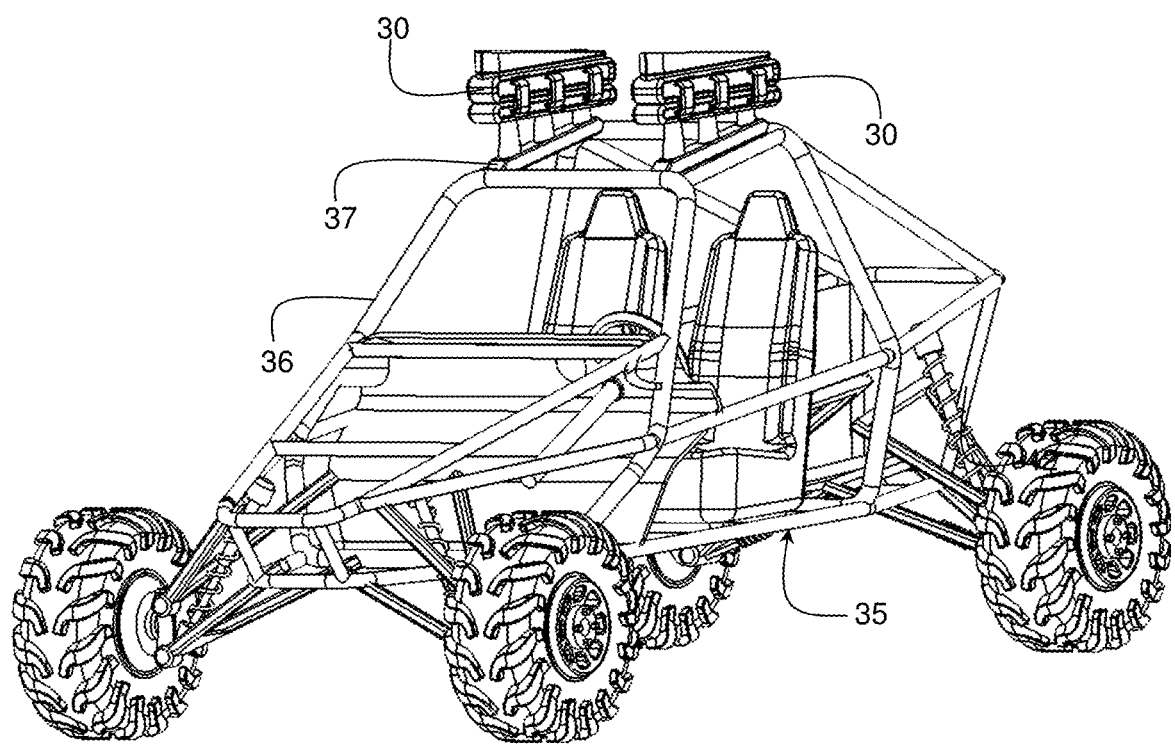
FIG. 6 is a pictorial view showing a partial detail of the terrain vehicle including connectors for manual latching by the coupling mechanism of the aerial platform.
Figure 7:
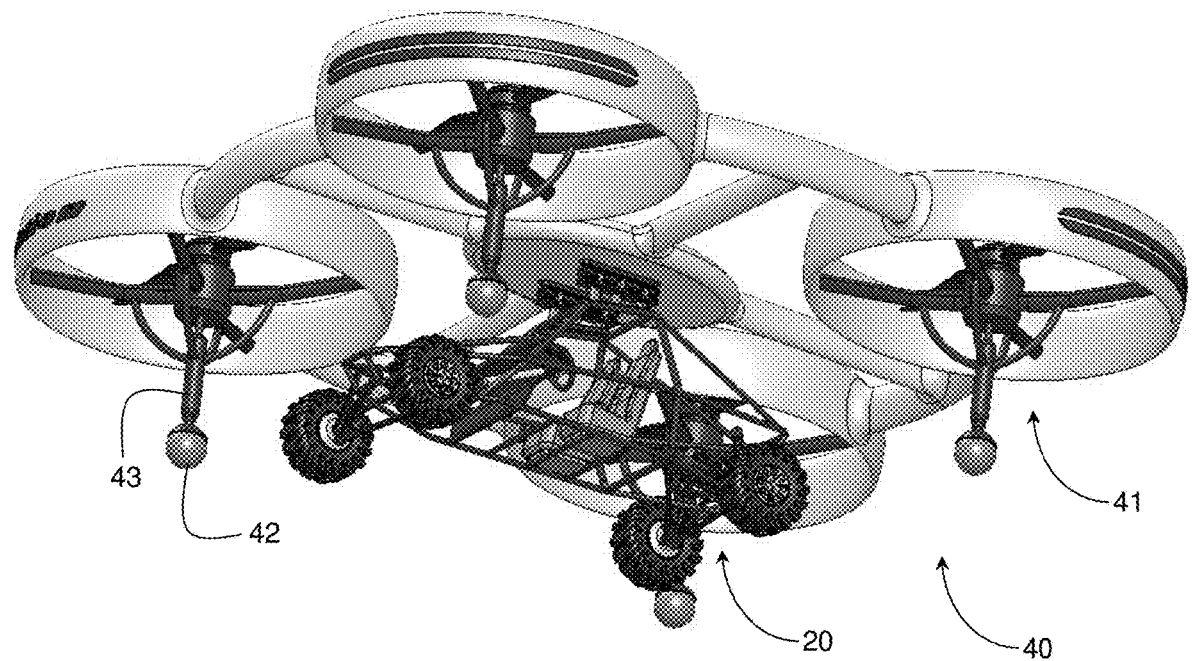
FIG. 7 is a pictorial perspective view showing a flying car according to a second embodiment wherein the terrain vehicle is coupled to a rotate wing aerial platform.
Figure 8:
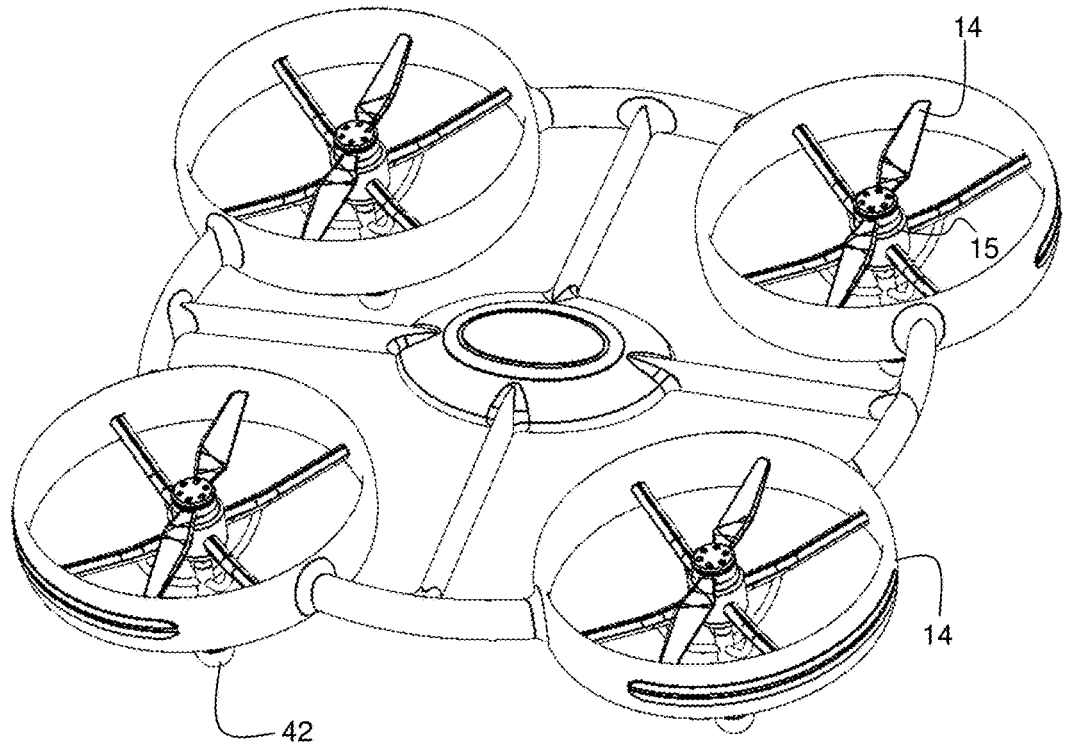
FIG. 8 is a pictorial plan view showing a detail of the rotate wing aerial platform.
Figure 9:
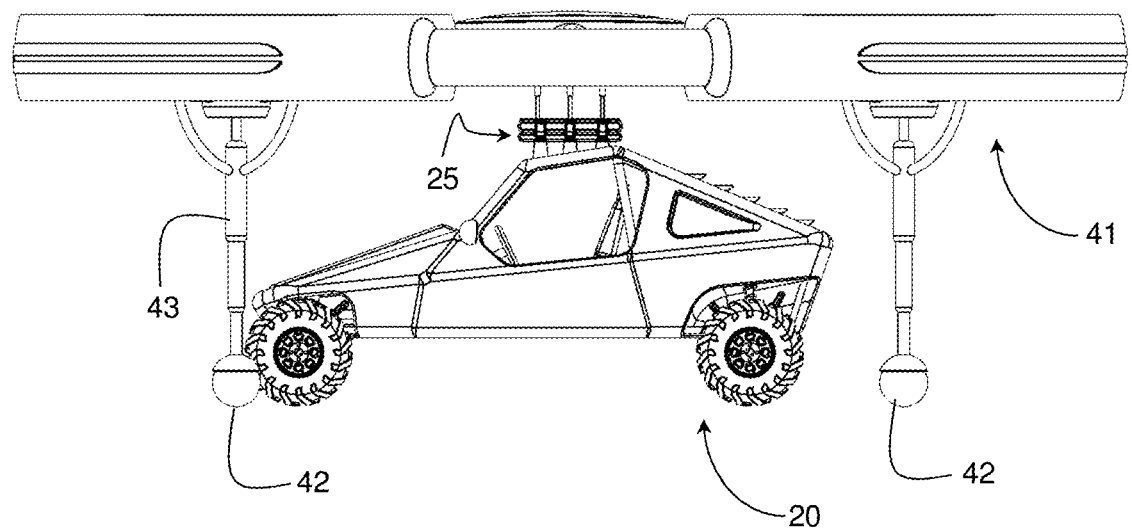
FIG. 9 is a pictorial side elevation showing the terrain vehicle prior to disengagement from the aerial platform.
Figure 10:
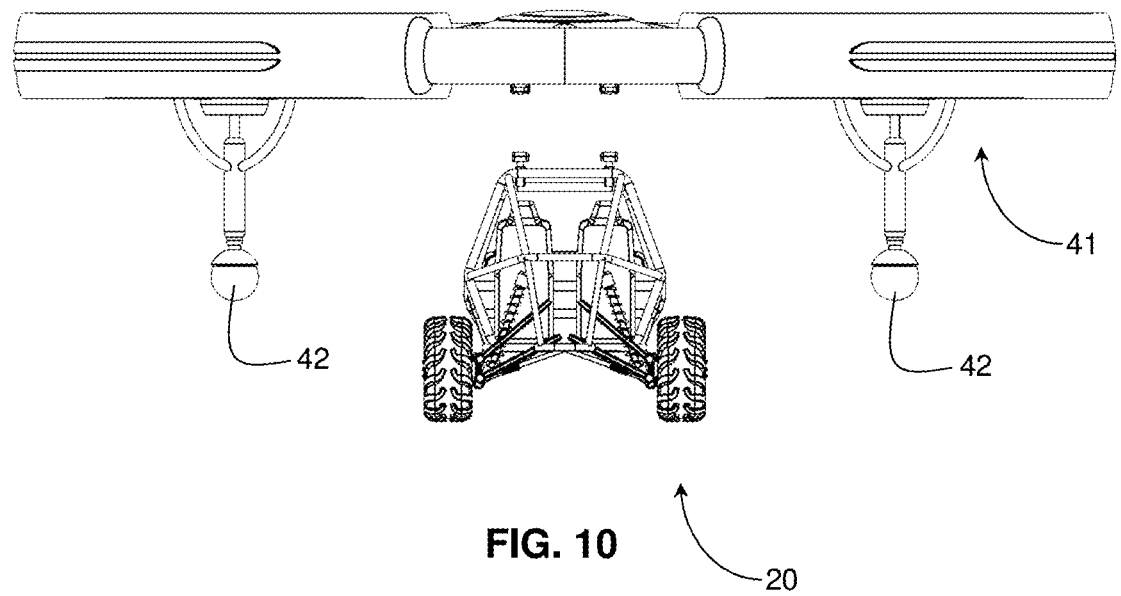
FIG. 10 is a partially exploded front elevation showing the terrain vehicle after disengagement from the aerial platform.

The terrain vehicle 20 hangs or is otherwise suspended from the aerial platform, for example by means of a pair of cable-operated latch mechanisms 25 that extend downward from a lower surface of the aerial platform shown in FIG. 5 each capable of being lowered until a pair of registration pins 27 engage complementary sockets in a mating connector 30 mounted on the roof of the terrain vehicle 20. Clasps 31 on opposite sides of the latch mechanism 25 are then retracted hydraulically or pneumatically via pistons 26 so as to close the clasps 31 from the open position shown in FIG. 5 whereby they engage recesses on the opposite sides of the connector 30. The latch mechanisms 25 are then retracted so as to lift the terrain vehicle 20 toward the fuselage of the aerial platform 11 as shown in FIG. 1. The height of the wingspan from the ground provides sufficient clearance for accommodating vehicles of varying heights, while the ability to raise and lower the latch mechanism 25 facilitates engagement with the roof connectors 30 regardless of the vehicle height. After landing, the latch mechanisms 25 are lowered via the pistons 26 so as to lower the vehicle to the ground, whereupon the clasps 31 are released in preparation for a ground phase. As shown in FIGS. 4 and 6, the vehicle has a chassis 35 comprising a matrix of welded struts 36 that extend to a reinforced roof 37 to which the connectors 30 are welded. This allows the vehicle to be coupled externally to the aerial platform and lifted or lowered by the connectors. When coupled to the aerial platform, the vehicle is transported thereby and thus flies with the aerial platform, the pilot and/or passengers being located in the terrain vehicle.

In some embodiments, the latch mechanism 25 includes controls that are automatically coupled to respective controls in the terrain vehicle 20, which then serves as a cockpit for allowing the motorist to pilot the airplane. Alternatively, the aerial platform 11 may be autonomous and be remotely controlled, thus obviating the need for the motorist to have a pilot license.

FIGS. 7 to 10 show a flying car 40 according to a second embodiment wherein the terrain vehicle 20 is coupled to a rotate wing aerial platform 41. The aerial platform 41 supports propellers 14 driven by a thruster 15 powered by a battery (constituting a fuel supply). The aerial platform 11 has latching mechanisms 25 as shown in FIG. 5 for coupling to a terrain vehicle 20. Also attached to the aerial platform 11 are adjustable legs 42 that serve as landing gear and each of which comprises at least two telescopic elements 43 that can be extended from an initial collapsed position shown in FIG. 7 during flight to an extended position shown in FIG. 9 on landing. Upon landing, the telescopic elements 43 are extended until the terrain vehicle 20 is lifted off the ground. The latch mechanisms 25 are then lowered via the pistons 26 so as to lower the vehicle to the ground and the clasps 31 are released in preparation for a ground phase.

Figure 11A:
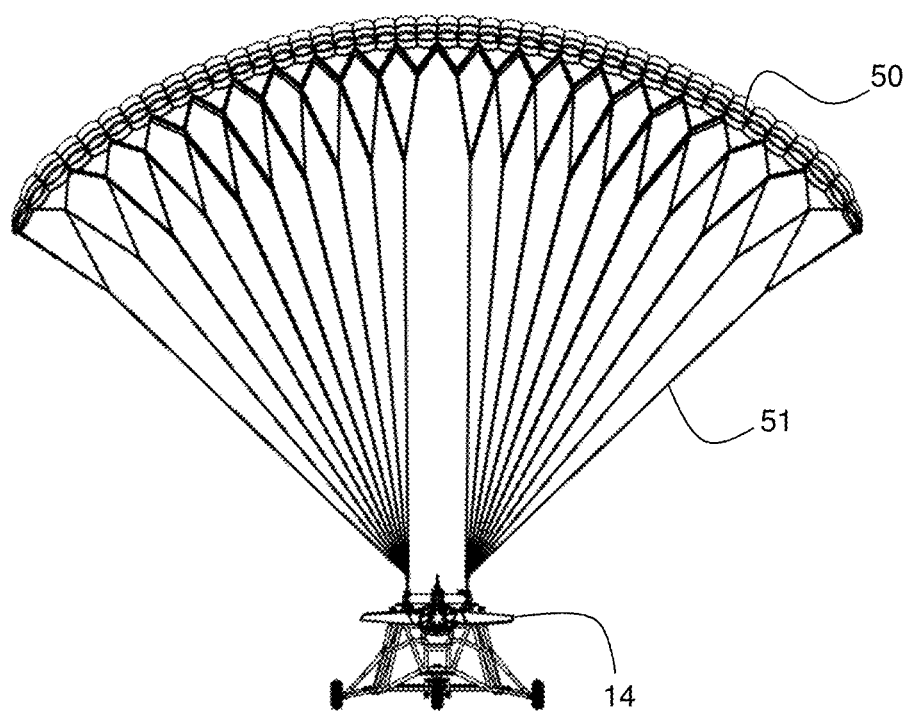
FIGS. 11a and 11b are pictorial front elevation and lower plan views of an aerial platform according to a third embodiment in the form of a parafoil-wing airplane.
Figure 11B:
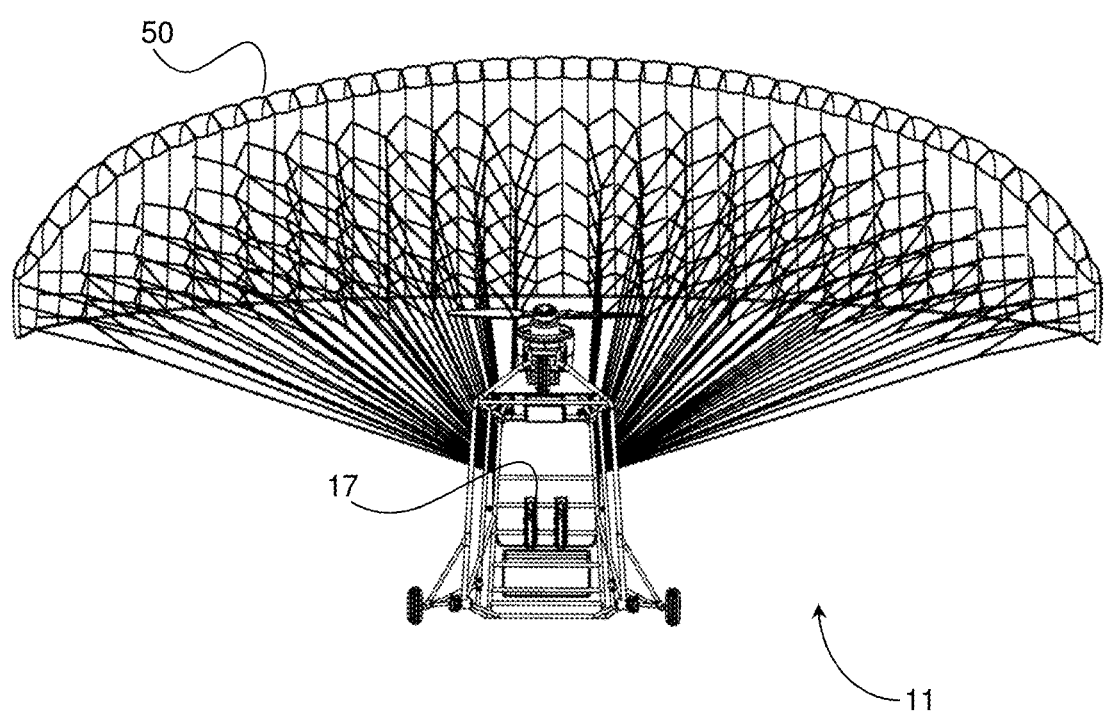

FIGS. 11a and 11b show respectively pictorial front elevation and lower plan views of an aerial platform 11 according to a third embodiment in the form of a parafoil-wing airplane prior to engagement of the terrain vehicle, which for clarity is not shown in the figures. The aerial platform 11 supports propellers 14 driven by a suitable thruster coupled to a fuel supply neither of which is shown in the drawings. The lift element is a parafoil 50 that is attached to the aerial platform 11 via tethers 51 in known manner. Coupling elements 17 are supported on an underside of the aerial platform 11 and operate as described above for engaging mating connectors mounted on the roof of the terrain vehicle.

The construction according to the invention also facilitates a business model whereby any motorist with a suitably modified terrain vehicle can hire an aerial platform to fly them out from an initial takeoff location to a landing site, where they can return the aerial platform and continue on their way by road. In those cases where the aerial platform is piloted, hiring the aerial platform effectively requires that the pilot also be hired unless the motorist has a pilot license.

If the aerial platform is autonomous, no on-board pilot is required but obviously it must still be controlled although the manner in which this is done is known per se.

For those embodiments where the terrain vehicle 20 serves as the cockpit, it may be provided with a kit for assembly in the terrain vehicle customized for the assemblies installed on the aerial platform. Such a kit will include a wireless control for controlling the control surfaces, engines and thrusters. In addition, telemetry is provided in the vehicle to receive data from the various flight control systems of the aerial platform for monitoring air speed, engine control, state of the control surfaces, etc. like in any normal aircraft. Alternatively, the flight controls may generate control signals that are conveyed by wires to control elements of the airplane structure, each of the wires having respective segments in the terrain vehicle and the airplane structure, the respective segments being adapted for mutual coupling via respective connectors in the terrain vehicle and the airplane structure. The coupling is preferably achieved automatically when coupling the terrain vehicle to the aerial platform, but can also be manual via a cable having connectors at opposite ends that are coupled to appropriate connectors in the aerial platform.

The aerial platform 11 may be produced in different dimensions according to the engine thrust, vehicle size and lift capacity resulting from wing size and shape. In such manner, a manufacturer will be able to adapt virtually any existing model of vehicle for coupling to an appropriate aerial platform and convert it into a flying vehicle. Heavier terrain vehicles are simply adapted for a more massive aerial platform. In effect, this renders the aerial platform universal since theoretically it can be fitted to all vehicles of every conceivable size and weight.

Independent aircraft engines provide thrust for takeoff, flight and landing. These engines also provide the electrical power needed to operate the air control surfaces and the instruments and other items that are installed in the cockpit during the flight. To this end, voltage is fed to the vehicle controls from the aerial platform to operate the aeronautical and electrical systems during flight. This avoids the need to use the vehicle battery during flight, since the vehicle alternator does not function in flight mode unless the vehicle engine is operating. This is generally not necessary other than to provide power for heating and air conditioning of the vehicle if required. Fuel is fed to the aircraft engines from fuel tanks mounted on the aerial platform, like any normal aircraft. Alternatively, the engines may be electric motors powered by a battery.

The consumer is able to buy the terrain vehicle from any manufacturer that produces models adapted for connection to the aerial platform. The consumer can change cars without restriction, as long as they are adapted for connection to an aerial platform of a type and size that he possesses or is able to hire.

During flight the aerial platform functions as an unmanned aerial vehicle, except that the operator sits in the car and not on the ground. When the motorist pilots the aircraft, flight control is performed wirelessly, using "Fly-By-Wire". The aircraft is controlled using controllers such as pedals, stick and throttles installed in the terrain vehicle. A basic physical connection point can also be installed by means of which the aerial platform can be flown from the terrain vehicle, even in an emergency situation where wireless communication between the vehicle and the aerial platform is lost.

The following table shows how control of the different functions of the aerial platform and the ground vehicle may be shared between the two vehicles:

TABLE I

| Component | Used during: | Location | During flight | During driving |
|---|---|---|---|---|
| Air throttle | Flight | One for each engine: installed on right/left of cabin/cockpit | Connected by control cables to the aircraft computer system | Disconnected |
| Stick | Flight | Cabin/cockpit | 3-axis rigid structure controls ailerons and altitude sticks Brake control using parachute or soft wing Glider control using rigid structure with glider wing | Disconnected |
| Right pedal | Flight/ground | Beneath right foot in pedal array facing the two front seats in the cockpit/cabin | Rudder | Vehicle engine throttle |
| Center pedal | Ground | Center of pedal array | Disconnected | Vehicle brake |
| Left pedal | Flight | Left of pedal array | Rudder | Disconnected |
| Gearbox | Ground | Center of cockpit/cabin | Not used | Gear control |
| Flight instrument array | Flight | Double opposite right and left seats in cockpit/cabin | Indicates air system data | Not used |
| Vehicle instrument array | Ground | On dashboard at center of cockpit/cabin | Not used | Indicates ground system data |
| Steering wheel | Ground | Opposite left or right seat according to local requirements | Disconnected | Controls steering |
| Ground steering wheel of aerial platform | Taxi, takeoff and landing runs | To left of left front seat of cockpit/cabin | Controls the wheel of primary landing gear | |

It will be appreciated that changes may be made to the construction of the aerial platform without departing from the scope of the claims. For example, although the invention has been described with particular reference to a fixed-wing plane, the aerial platform may be a suitably modified rotate-wing adapted for coupling to the terrain vehicle. The manner of coupling is not limited to what is described, it being only important that the coupling be releasable and secure and operate to couple the terrain vehicle external to the lower surface of the aerial platform. In the embodiment as described, the terrain vehicle is supported from its roof since this provides easy access without the need for providing brackets that allow connection to the chassis from below. But no limitation is thereby implied. Likewise, the terrain vehicle can be a motorcycle that is provided with a bracket for suspending from the aerial platform and which has a connector that couples to the computer on board the aerial platform so as to allow the motor cycle to double as the aircraft cockpit. In this case, the handlebar may serve to control the steering of the aircraft landing gear through the coupling. Other changes will likewise be apparent to those skilled in the art.

It should also be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

The description of the above embodiments is not intended to be limiting, the scope of protection being provided only by the appended claims.

The invention claimed is:

1. An aerial platform comprising a structure that supports lift elements, thrusters, landing gear and a fuel supply and has a coupling mechanism external to said structure adapted for coupling to a suitably adapted terrain vehicle so as to convert the terrain vehicle to a flying vehicle;
the aerial platform has a wingspan whose height from the ground provides sufficient clearance for accommodating terrain vehicles of different heights,
the coupling mechanism is adapted to engage one or more connectors supported directly or indirectly by a chassis of the terrain vehicle,
the coupling mechanism is capable of engaging the connectors regardless of the height of the terrain vehicle and of supporting the terrain vehicle off the ground after engagement;
wherein the coupling mechanism is capable of being lowered and raised in order to facilitate engagement with the connectors regardless of the height of the terrain vehicle and to lift the terrain vehicle off the ground after engagement.

2. The aerial platform according to claim 1, further including adjustable legs that serve as landing gear and each of which comprises at least two telescopic elements that can be extended between a collapsed position and an extended position.

3. The aerial platform according to claim 2, wherein height adjustment of the adjustable legs serves to lower and raise the coupling mechanism in order to facilitate engagement with the connectors regardless of the height of the terrain vehicle and to lift the terrain vehicle off the ground after engagement.

4. A flying vehicle comprising the aerial platform according to claim 1 coupled to a terrain vehicle, wherein the terrain vehicle forms the cockpit of the flying vehicle.

5. The flying vehicle according to claim 1, wherein the terrain vehicle includes flight controls that are automatically coupled to the airplane structure when the terrain vehicle is coupled to the airplane structure.

6. The flying vehicle according to claim 5, wherein the flight controls includes levers that are coupled via the coupling mechanism to control elements of the airplane structure.

7. The flying vehicle according to claim 5, wherein the flight controls generate control signals that are conveyed wirelessly to control elements of the airplane structure.

8. The flying vehicle according to claim 5, wherein the flight controls generate control signals that are conveyed by wires to control elements of the airplane structure, each of said wires having respective segments in the terrain vehicle and the airplane structure and said respective segments being adapted for mutual coupling via respective connectors in the terrain vehicle and the airplane structure.

9. The flying vehicle according to claim 1, wherein the terrain vehicle serves only as a payload and the airplane structure is adapted for remote control.

10. The flying vehicle according to claim 1, wherein the coupling mechanism includes at least one latch mechanism adapted to latch on to said one or more connectors.

11. The flying vehicle according to claim 10, wherein the one or more connectors are fixed to elements mounted on a roof of the terrain vehicle.

12. The flying vehicle according to claim 10, wherein each latch mechanism includes on opposite sides thereof clasps capable of being retracted hydraulically or pneumatically via pistons so as to close the clasps from an open position to a closed position wherein they engage recesses on opposite sides of the respective connector.

13. The aerial platform according to claim 10, wherein each latch mechanism includes on opposite sides thereof clasps capable of being retracted hydraulically or pneumatically via pistons so as to close the clasps from an initially open position.

14. The aerial platform according to claim 1, being a fixed-wing airplane wherein the lift elements are wings mounted on opposite sides of a fuselage of the aerial platform and the thrusters are engines mounted under the wings.

15. The aerial platform according to claim 1, being a rotate-wing aircraft wherein the lift elements are rotor blades.

16. The aerial platform according to claim 15, further including adjustable legs that serve as landing gear and each of which comprises at least two telescopic elements that can be extended between a collapsed position and an extended position.

17. The aerial platform according to claim 1, being a parafoil wing aircraft wherein the lift elements are parafoils.

* * * * *